(12) United States Patent
Cretors et al.

(10) Patent No.: US 7,641,460 B2
(45) Date of Patent: Jan. 5, 2010

(54) COTTON CANDY HANDLING DEVICE

(75) Inventors: Charles D. Cretors, Lake Forest, IL (US); Nenad Vidojevic, Chesterton, IN (US); Danielle Lasater, Elmhurst, IL (US); Leslie K. DiMare, Hawthorn Woods, IL (US); Andrew James Hoover, Aurora, IL (US); Stephanie M. Ziegle, Park Forest, IL (US)

(73) Assignee: C. Cretors & Company, Chicago, IL (US)

( * ) Notice: Subject to any disclaimer, the term of this patent is extended or adjusted under 35 U.S.C. 154(b) by 0 days.

(21) Appl. No.: 11/443,335

(22) Filed: May 30, 2006

(65) Prior Publication Data

US 2007/0278706 A1 Dec. 6, 2007

(51) Int. Cl.
*A23G 3/00* (2006.01)
(52) U.S. Cl. .................... 425/9; 425/8; 264/8
(58) Field of Classification Search ............ 425/8, 425/9, 145, 222, 404, 445–446, 332, 425, 425/72.2, 378.1, 382.2, 382.3, 382.4; 264/8; 426/465, 515, 516, 517, 658; 99/348; 219/385
See application file for complete search history.

(56) References Cited

U.S. PATENT DOCUMENTS

| | | | | |
|---|---|---|---|---|
| 796,528 | A * | 8/1905 | Pollock | 425/9 |
| 816,114 | A * | 3/1906 | Morrison | 425/9 |
| 1,374,938 | A * | 4/1921 | McNulty, Jr. | 118/19 |
| 1,489,342 | A * | 4/1924 | Brent | 425/9 |
| 1,806,111 | A * | 5/1931 | Moad | 425/9 |
| 2,451,096 | A * | 10/1948 | Kooman | 426/305 |
| 2,658,615 | A * | 11/1953 | Ebersole | 209/11 |
| 2,919,184 | A * | 12/1959 | Osswald et al. | 264/14 |
| 3,042,183 | A * | 7/1962 | Ackley | 198/392 |
| 3,101,040 | A * | 8/1963 | Lanz | 99/471 |
| 3,142,862 | A * | 8/1964 | Guldman | 425/97 |
| 3,174,182 | A * | 3/1965 | Duncan | 425/8 |
| 3,198,655 | A * | 8/1965 | Gisiger | 427/212 |
| 3,436,927 | A * | 4/1969 | Gruber | 426/516 |
| 3,580,456 | A * | 5/1971 | Zueger et al. | 227/100 |
| 3,599,938 | A * | 8/1971 | Anders et al. | 366/24 |
| 3,716,315 | A * | 2/1973 | King | 425/8 |
| 3,807,552 | A * | 4/1974 | Gotthard | 209/11 |
| 3,856,443 | A * | 12/1974 | Salvi | 425/9 |
| 3,877,918 | A * | 4/1975 | Cerbo | 65/142 |
| 3,930,043 | A | 12/1975 | Warning et al. | |
| 4,061,790 | A | 12/1977 | Cole, Jr. | |
| 4,310,342 | A * | 1/1982 | Richards | 65/27 |

(Continued)

FOREIGN PATENT DOCUMENTS

JP 06-343394 * 12/1994 ............ 425/9

OTHER PUBLICATIONS

Page from C. Cretors & Company Brochure, 1980's.

(Continued)

*Primary Examiner*—Philip C Tucker
*Assistant Examiner*—Dimple N Bodawala
(74) *Attorney, Agent, or Firm*—Perkins Coie LLP (57) ABSTRACT

A device and method for continuous production of cotton candy and automated handling of the cotton candy in a way that collects and condenses the cotton candy into a continuous strand.

11 Claims, 5 Drawing Sheets

U.S. PATENT DOCUMENTS

| | | | | |
|---|---|---|---|---|
| 4,323,524 | A * | 4/1982 | Snowden | 264/8 |
| 4,339,402 | A * | 7/1982 | Henry | 264/40.1 |
| 4,360,328 | A | 11/1982 | Kassabian | |
| 4,430,003 | A * | 2/1984 | Beattie et al. | 366/137.1 |
| 4,658,708 | A | 4/1987 | Rastoin | |
| 4,831,959 | A * | 5/1989 | Turner | 118/303 |
| 4,846,643 | A | 7/1989 | Yamamoto et al. | |
| 4,872,821 | A * | 10/1989 | Weiss | 425/9 |
| 5,010,838 | A * | 4/1991 | Simelunas et al. | 118/19 |
| 5,066,430 | A * | 11/1991 | Matthews | 264/8 |
| 5,100,592 | A * | 3/1992 | Sparks et al. | 264/7 |
| 5,292,238 | A | 3/1994 | Michalak | |
| 5,346,377 | A * | 9/1994 | Bogue et al. | 425/9 |
| 5,427,811 | A * | 6/1995 | Fuisz et al. | 426/465 |
| 5,445,769 | A * | 8/1995 | Rutkowski et al. | 264/8 |
| 5,498,144 | A * | 3/1996 | Francis et al. | 425/9 |
| 5,511,961 | A * | 4/1996 | Sullivan | 425/9 |
| 5,520,859 | A * | 5/1996 | Bogue et al. | 264/8 |
| 5,581,477 | A * | 12/1996 | Hanaoka | 700/266 |
| 5,645,878 | A * | 7/1997 | Breslin et al. | 426/103 |
| 5,728,397 | A * | 3/1998 | Fuisz | 424/439 |
| 5,750,173 | A * | 5/1998 | Kazemzadeh | 426/516 |
| 5,755,880 | A | 5/1998 | Norman et al. | |
| 5,766,643 | A * | 6/1998 | Hammon | 425/9 |
| 5,779,946 | A * | 7/1998 | Bogue et al. | 264/8 |
| 5,831,123 | A * | 11/1998 | Gergely et al. | 562/584 |
| 5,834,033 | A * | 11/1998 | Abdi et al. | 425/8 |
| 5,876,764 | A | 3/1999 | Buttin et al. | |
| 5,939,120 | A * | 8/1999 | Bogue et al. | 426/465 |
| 6,612,823 | B2 | 9/2003 | Bandou et al. | |
| 7,022,353 | B2 | 4/2006 | Degady et al. | |
| 7,300,269 | B2 * | 11/2007 | Ryan | 425/9 |
| 2002/0062743 | A1 * | 5/2002 | Weiss | 99/348 |
| 2005/0238774 | A1 | 10/2005 | Weiss | |

OTHER PUBLICATIONS

International Search Report and Written Opinion; International Patent Application No. PCT/US07/69980; Filed: May 30, 2007; Applicant: C.Cretors and Company; Mailed on Dec. 5, 2008.

\* cited by examiner

COTTON CANDY HANDLING DEVICE

BACKGROUND OF THE INVENTION

1. Field of the Invention

The present invention generally relates to machines for making cotton candy. More particularly, the present invention is directed to a device and method for continuous production of cotton candy and automated handling of the cotton candy in a way that collects and condenses the cotton candy for automated packaging.

2. Discussion of the Prior Art

Cotton candy traditionally is made by melting granular sugar in a spinning head that has holes around its periphery. The sugar liquifies due to contact with a heating element in the head, and is thrown outward through the holes by centrifugal force. The melted sugar exits the head as very fine thread-like strands which are cooled as soon as they reach the ambient air around the head, and return to a solid state. As long as the heating element is engaged and the head continues to receive sugar, the spinning head is capable of making cotton candy.

The head is commonly mounted atop a drive unit at the end of a drive shaft. One of the difficulties faced in making cotton candy is in the handling and control of the light and airy product as it is being made. Most often, the drive shaft passes through an opening in the bottom of a very large bowl that sits atop the drive unit to collect the cotton candy as it is produced. As the head spins out webs of cotton candy, it is collected around the perimeter of the bowl. Periodically, roughly every 30 to 60 seconds, an operator dips a carrier stick or paper cone into the bowl to remove a portion of the accumulated cotton candy for serving or packaging. Because of the constant need for the operator to monitor and participate in the collection and removal process, the traditional way of making cotton candy tends to be labor intensive. The tendency of the cotton candy to be very billowy, warm and sticky as it collects in the bowl, also can tend to make the process messy and more difficult to manage, further adding to the labor necessary.

There have been attempts to automate collection of cotton candy, but they have continued to rely on intermittent dipping into a collection bowl, by a series of sticks, paper tubes, or paddles, or otherwise lifting bundles of cotton candy upward and out of a bowl. Some of these attempts are shown in U.S. Pat. Nos. 3,930,043, 4,360,328, 5,292,238, 5,876,764 and 6,612,823. In U.S. Pat. No. 6,612,823, there is mention in columns 1 and 2, and depiction in FIGS. 27 and 28 of a prior art embodiment from Japanese Patent Application Laying-open No. 6-343394. The Japanese prior art represents another such attempt to automate, but includes a spinning head supported from above, while still spinning the cotton candy into a bowl from which it must be lifted with sticks. Even with those methods that try to automate a process of feeding accumulated cotton candy in a strand from a bowl, it appears that operator intervention would be required to restart the process if the strand were to break, and such equipment still appears as though it would require quite a bit of labor to deal with cleaning and maintenance of the fairly complicated equipment.

The prior art also includes some food processing equipment that includes use of rotating drums as coaters, to apply coatings to food products that are in small pieces, such as popcorn, nuts or gum. Such coaters commonly include some means to introduce spray heads or other inputs to add foreign substances that serve as the coating material to be mixed among the small pieces of the base food product. They also typically have agitators and some propulsion means that acts to stir the pieces of food and as a screw feed to propel the food through the drum. However, it is believed that to date nothing of this nature has been used in handling cotton candy, and especially not in the handling of such a delicate product or with the intention of creating and maintaining a continuous strand of such a fine, threadlike product.

It would be advantageous to be able to produce cotton candy on a continuous basis, without need for an operator to periodically manually remove cotton candy from a collection bowl, or be concerned with interruption of production. It also would be advantageous to be able to support and drive a cotton candy spinning head from above and to be able to inherently catch the continuous production of cotton candy as it falls due to gravity, as opposed to having to lift the cotton candy out of a bowl. It would be desirable to be able to automatically catch and form cotton candy into a continuous manageable strand of cotton candy for processing by automatic packaging equipment, regardless of whether it is made via use of a spinning head or other means such as a spray or extrusion device. It further would be desirable to be able to use very simple equipment in the handling of the cotton candy, to enhance the reliability, and minimize the difficulty in cleaning and maintaining the handling device.

The present invention addresses shortcomings in prior art cotton candy making equipment and processes, while providing the above mentioned desirable features.

SUMMARY OF THE INVENTION

The purpose and advantages of the invention will be set forth in and apparent from the description and drawings that follow, as well as will be learned by practice of the invention.

The present invention is generally embodied in a process of making a continuous strand of cotton candy and in the equipment for performing the process. The process preferably utilizes a rotating chute to roll the web of cotton candy upon itself to condense the web and enhance its ability to be processed by automated packaging equipment. The process also preferably uses a spinning head supported and driven from above, with the threads of cotton candy solidifying and falling as a web within a hopper to be collected within a funnel shaped opening. As the cotton candy web falls it is cooled and moves through the funnel shaped opening at the bottom of the hopper, it is bent and received in the rotating chute for rolling into the more manageable continuous strand. Once formed into a continuous strand, the cotton candy may be advanced, such as on a conveyor to cutting and packaging equipment.

The process and device of the present invention remove the labor intensive nature of prior art methods of making cotton candy. The invention permits the cotton candy making process to be started and to be run continuously as long as the equipment continues to function, regardless of any separation of the strand of cotton candy being formed. The process also is less likely to result in breaks in the strand, because the web of cotton candy being formed into a continuous strand need not be lifted or pulled, as is common in the prior art methods of removing cotton candy as it is being made. Indeed, the cotton candy need not become attached to the side of a bowl, and the process may utilize simple gravity as a means of conveying the cotton candy web into the chute to form the more condensed strand.

Given the advantageous continuous nature of the cotton candy strand formation in the rotating chute of the present invention, while suitable for use with a spinning head supported and driven from above, it is ideally suited for use with any other form of continuous cotton candy production, including methods that may involve making cotton candy threads via a spray or extrusion head. Moreover, the simple, reliable and durable structure shown in the mechanisms of the preferred embodiments, and that may be employed via the present invention, make it suitable for use in a variety of settings, including with automated cutting and packaging equipment, which are not themselves part of the present invention.

In a first aspect of the invention, a cotton candy handling device is provided that has a chute having a longitudinal axis and being rotatably mounted on a frame, the exterior of the chute engaging a drive mechanism that rotates the chute about its longitudinal axis as the chute accepts cotton candy into a first end and rolls the cotton candy on itself creating a more condensed strand which exits a second end of the chute.

In another aspect of the invention, a cotton candy handling device is provided that includes a drive unit having a drive shaft extending downward, a cotton candy spinning head having a heating element and being mounted on the drive shaft, the spinning head being located within a hopper, the hopper having an outlet, a chute rotatably mounted and positioned to receive cotton candy from the hopper outlet.

In a further aspect of the invention, a process of forming cotton candy into a continuous strand comprising is provided. The process includes producing cotton candy, directing the cotton candy into a first end of a chute wherein the chute is positioned to have a second end lower than the first end and wherein the chute has a longitudinal axis, rotating the chute about the longitudinal axis while the cotton candy is in the chute so as to roll the cotton candy upon itself, increasing the density of the cotton candy and forming a longitudinal continuous strand within the chute.

Thus, the present invention presents a device and method for the continuous production of cotton candy. The invention allows production with very simple equipment, with a relatively clean and reliable process that involves minimal operator labor.

It is to be understood that both the foregoing general description and the following detailed description are exemplary and provided for purposes of explanation only, and are not restrictive of the invention, as claimed. Further features and objects of the present invention will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the drawings are not to scale. While considerable mechanical details of a cotton candy handling device, including other plan and section views of the particular components, have been omitted, such details are considered well within the comprehension of those skilled in the art in light of the present disclosure. It also should be understood that the present invention is not limited to the preferred embodiments illustrated.

DETAILED DESCRIPTION OF THE PREFERRED EMBODIMENTS

Referring generally to FIGS. 1-4b and upon review of this description, it will be appreciated that a cotton candy handling device of the present invention generally may be embodied within numerous configurations.

Referring to a preferred embodiment in FIGS. 1, 2, 3A and 4A, a cotton candy handling device 10 is shown for making a continuous strand of cotton candy that will be ready to advance to automated packaging equipment. Device 10 includes the production and handling equipment to make the continuous strand. Thus, by way of example, the preferred embodiment of device 10 includes a first frame 12, having legs 14, a base 16 and a top bridging portion 18.

Figure 1:
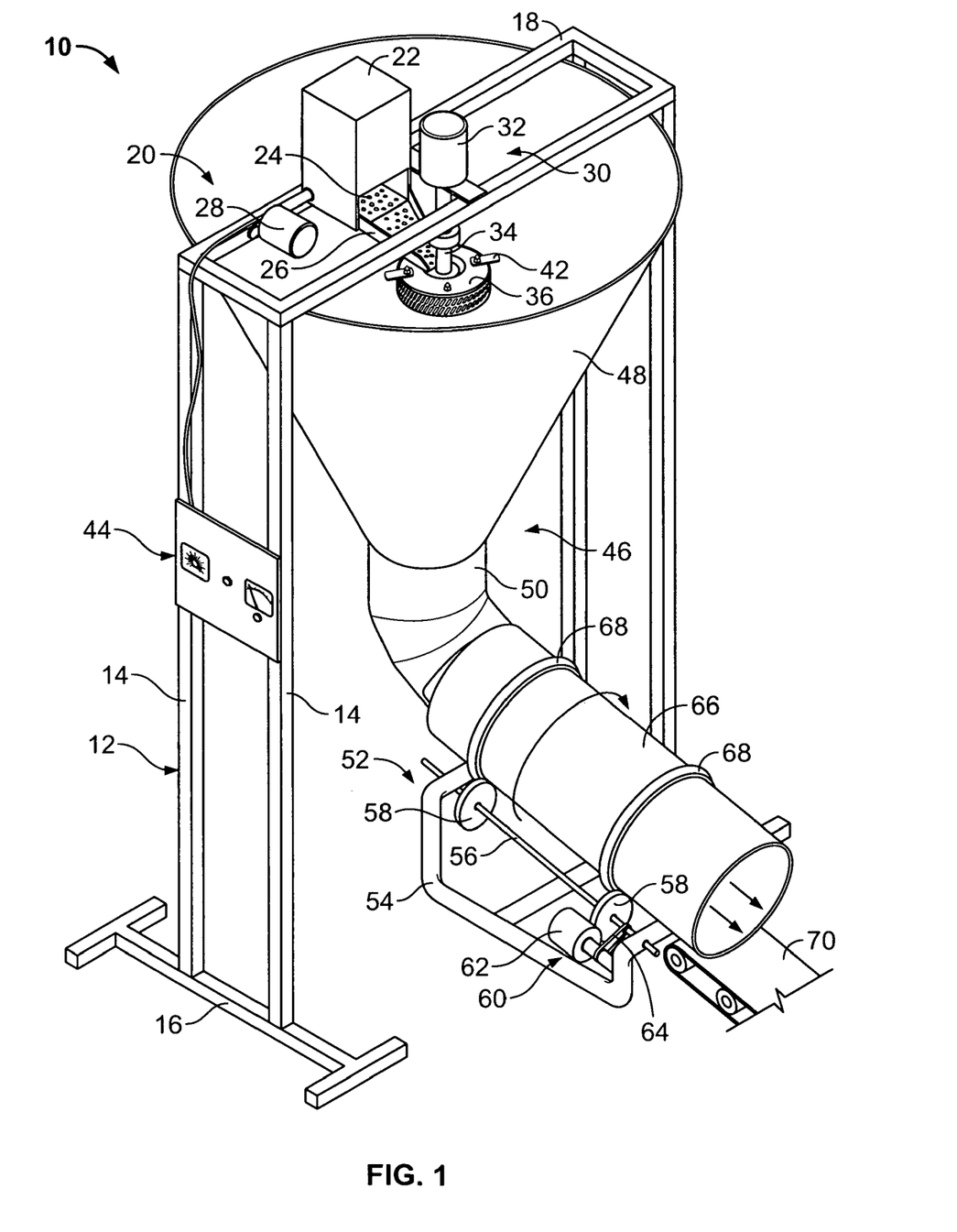
FIG. 1 is a perspective view of a cotton candy making and handling device.

In this simplified example, mounted atop bridging portion 18 are a few components. First, is a sugar supply system 20. Sugar supply system 20 includes a hopper 22 which holds a supply of sugar 24, which exits the hopper by way of channel 26. The flow of sugar 24 is controlled by a drive motor 28 which is connected to an auger (not shown) in the bottom of hopper 22 to affect the flow of sugar 24.

Also mounted atop bridging portion 18 is a drive unit 30 having a drive motor 32, which preferably is an electric motor, and a drive shaft 34 which extends downward. Mounted at the distal end of drive shaft 34 is a spinning head 36 which is of fairly common design except that it is connected to a drive shaft from above as opposed to from below it. Head 36 is open from above with a compartment to accept the flow of granular sugar from channel 26 necessary to make the cotton candy C, and in this example includes an internal heating element (not shown) to melt the sugar. It will be appreciated that any suitable heating means would be acceptable, whether internal or external, and whether via electrical, flame or other source of heat, and all such suitable configurations are intended to be referred to herein as forming a heating element.

Figure 3A:
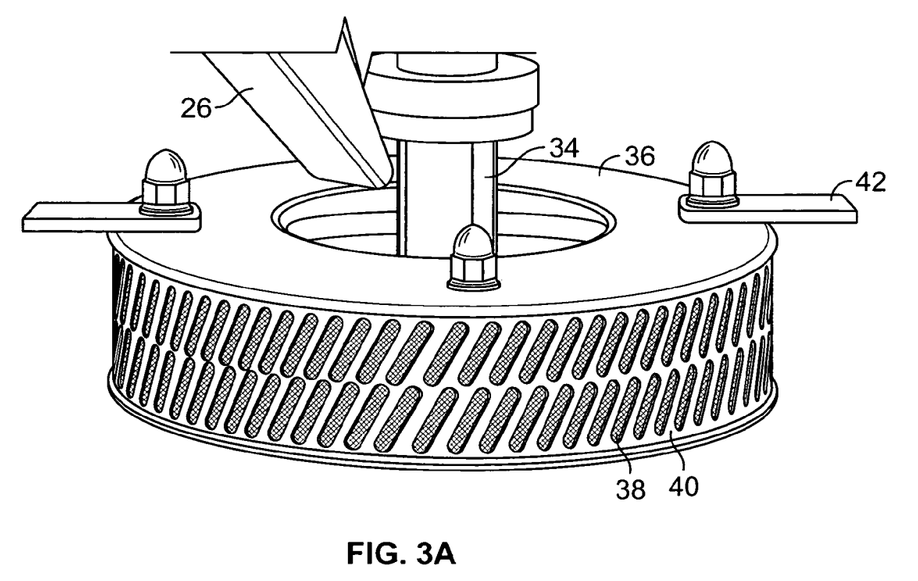
FIG. 3A is a perspective view of a spinning head with simple fins on the top side to assist in trying to keep the cotton candy from rising when being spun outward from the head.

In this embodiment, as best seen in FIG. 3A, head 36 further includes a cylindrical screen 38 and slotted peripheral outer wall 40 through which the liquified sugar is thrown by centrifugal force when head 36 is spinning. To assist in keeping the cotton candy from flying upward, connected to and extending outward from the upper surface of head 36 is a pair of tabs 42.

Figure 3B:
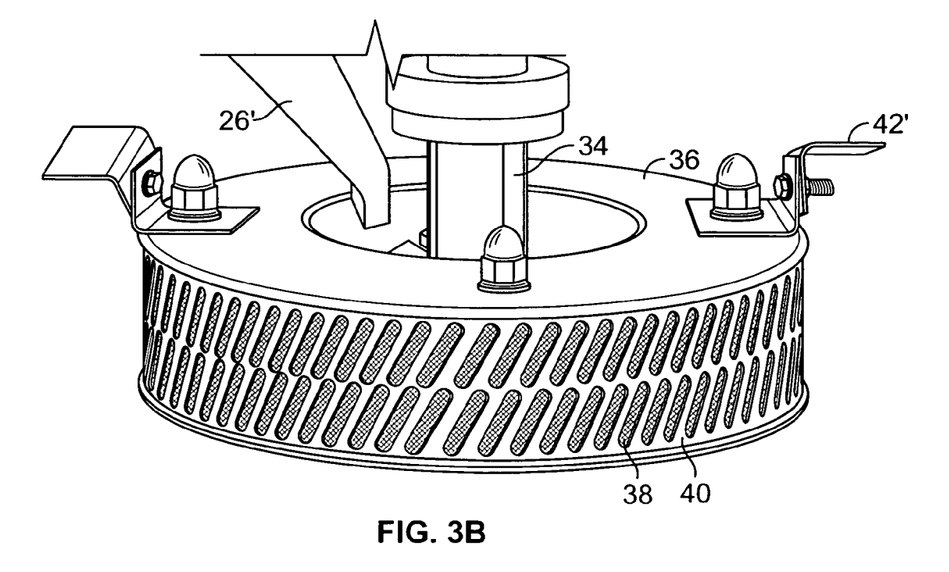
FIG. 3B is a perspective view of a spinning head with alternative angled blades to assist in trying to keep the cotton candy from rising when being spun outward from the head by introducing air flow to propel the cotton candy downward.
Figure 3C:
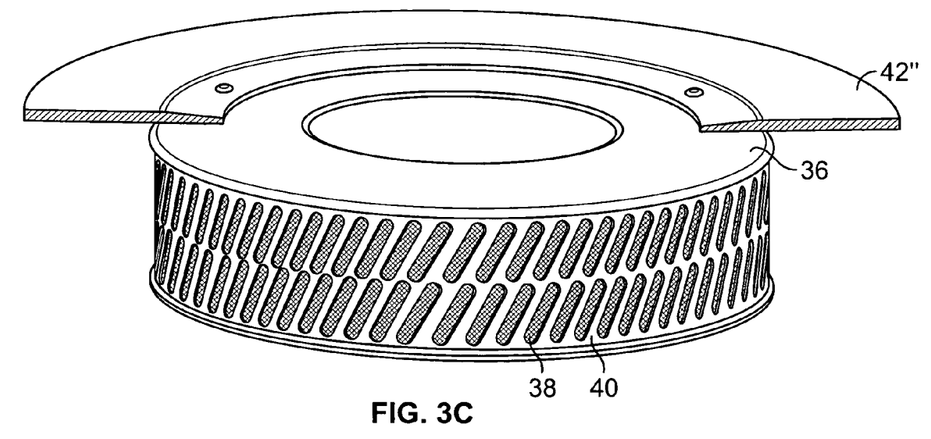
FIG. 3C is a perspective view of a spinning head with a further alternative shield mounted on the top side to block the cotton candy from rising when being spun outward from the head.

An alternative to straight tabs 42 is shown in FIG. 3B in the form of angled blades 42'. These blades create downward air flow to help keep the cotton candy C from flying upward. To prevent the windage from affecting the feeding of sugar 24 into head 36, a modified, covered channel 26' that reaches closer to the opening in the top of head 36 may be used. A further alternative to straight tabs 42 is provided in FIG. 3C. This alternative includes a shield 42" mounted on the top side of head 36 to block the cotton candy C from rising when being spun outward from head 36. As the cotton candy C is blocked by shield 42" it tends to bond together and then fall downward by the force of gravity. While these alternatives have been provided as examples, other suitable head configurations may be used. Also, as previously noted, the cotton candy C could be made continuously via a spray or extrusion head, if desired.

Controls 44 for sugar supply system 20, drive unit 30 and the heating element in head 36 are mounted to legs 14 on the side of first frame 12. It will be appreciated that these various components all can be constructed in a variety of configurations and from a variety of suitable materials, all within the intended scope of the invention.

Figure 2:
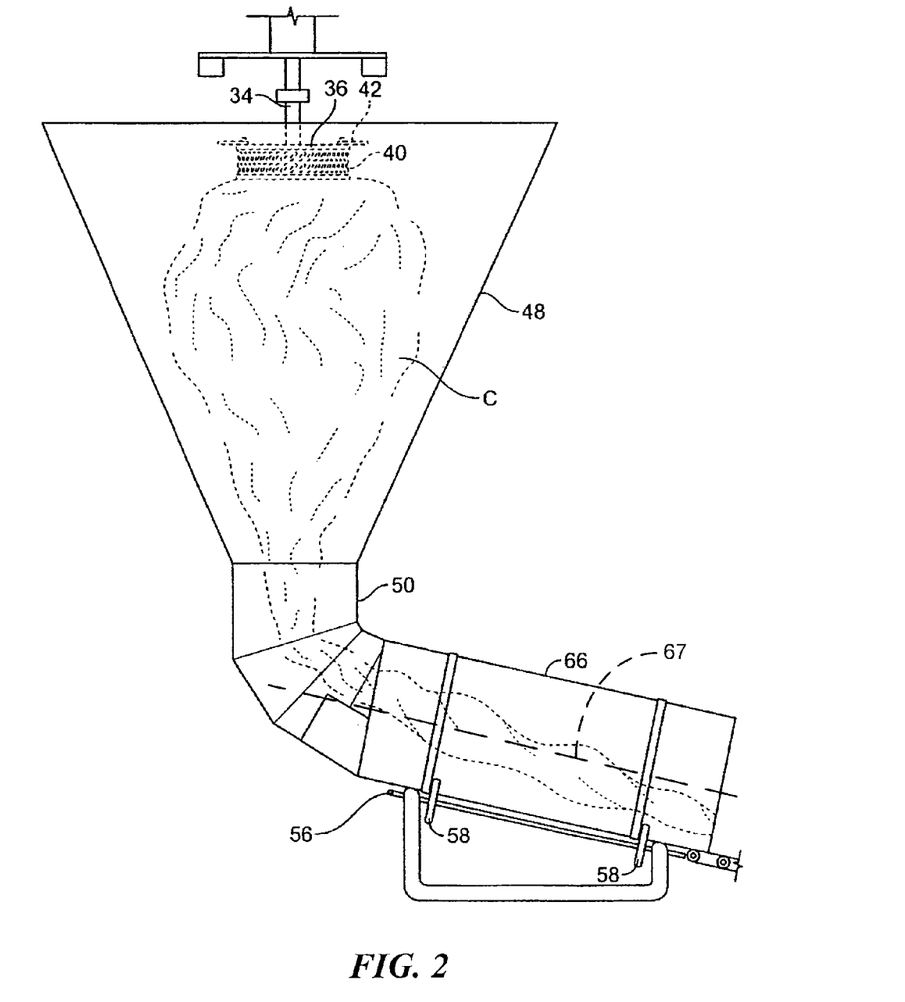
FIG. 2 is a side view of a simplified version of the device with a representation of cotton candy being made and falling downward within a hopper and moving through the chute.

Device 10 also includes a cotton candy catching system 46, which includes a large hopper 48 and a transition chute or bent tube 50. In this example embodiment, large hopper 48 is funnel-shaped and connected to bridging portion 18, with bent tube 50 connected to the open lower end of hopper 48. As best seen in FIG. 2, hopper 48 preferably is constructed to have a diameter toward its upper end sufficiently large enough that the cotton candy C does not contact the wall of hopper 48 at the height of head 36. This permits the cotton candy C to tend to cool, solidify and fall downward into the lower portion of hopper 48 where the funnel shape causes the cotton candy to come together to pass through bent chute 50. Hopper 48 and bent tube 50 are preferably made of rigid material such as stainless steel, plastic or any other suitable material which is likely to facilitate rapid cleaning.

Further included in device 10 is a rolling system 52, located at the outlet of bent tube 50. Rolling system 52 preferably includes a second frame 54 which rotatably supports a pair of axles 56 on which are mounted rolling elements 58, such as wheels or roller. In this example, a drive unit 60 preferably includes an electric motor 62 mounted on second frame 54 and uses a belt 64 to drive at least one axle 56 to turn a pair of rolling elements 58. Resting atop and in engagement with rolling elements 58 is a straight cylindrical chute 66, which rotates about a longitudinal axis 67 in accordance with the rotation of rolling elements 58. Chute 66 has tracks 68 on its outer wall to engage rolling elements 58 to maintain the position of chute 66 relative to second frame 54. However, rolling system 52 may use other forms to drive a cylindrical or rolling chute, such as a belt drive that directly engages the outer surface of a cylindrical chute, or other known systems to achieve rotation of a cylindrical object.

Chute 66 has an inner diameter that is larger than the outer diameter of bent tube 50, and similarly is preferably made of rigid materials, such as stainless steel, plastic or other suitable materials. By this arrangement, chute 64 is preferably positioned to be concentric with and slightly overlapping the exit end of smaller diameter bent tube 50, so as to be able to freely rotate with respect to the outlet end of bent tube 50, and thereby receive cotton candy C after it passes through bent tube 50.

Figure 4A:
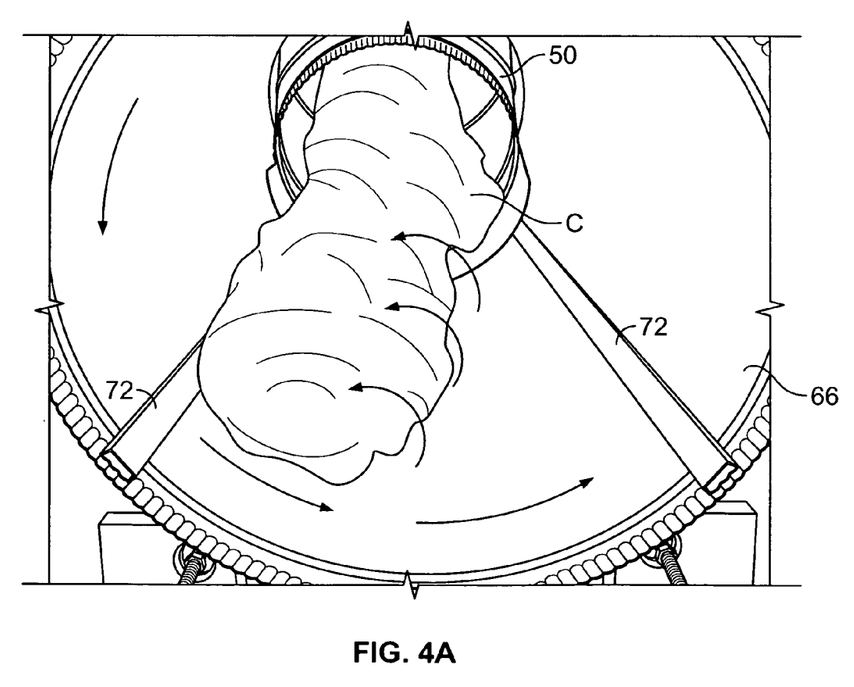
FIG. 4A is a perspective view of the inside of the rotating chute, with longitudinal rectangular elements on the inner walls of the chute.

Rolling system 52 rotates cylindrical chute 66 so as to roll the cotton candy C as it passes through chute 66. This rolling action essentially causes the cotton candy C to be condensed to a more manageable form of a strand that is intended to exit chute 66 and be received by further handling and packaging equipment, the beginning of which is represented by conveyor 70. The rolling action of cotton candy C is preferably enhanced by longitudinal engagement members 72 on the inner wall of chute 66. Such engagement members 72 are seen in FIG. 4A, in the form of a plurality of rectangular protruding elements which tend to engage the cotton candy C as chute 66 is rotated and push the cotton candy C at its periphery so as to attempt to climb the cylindrical wall of chute 66, only to eventually release from the engagement member 72 and roll back down toward the bottom of the cylinder.

Figure 4B:
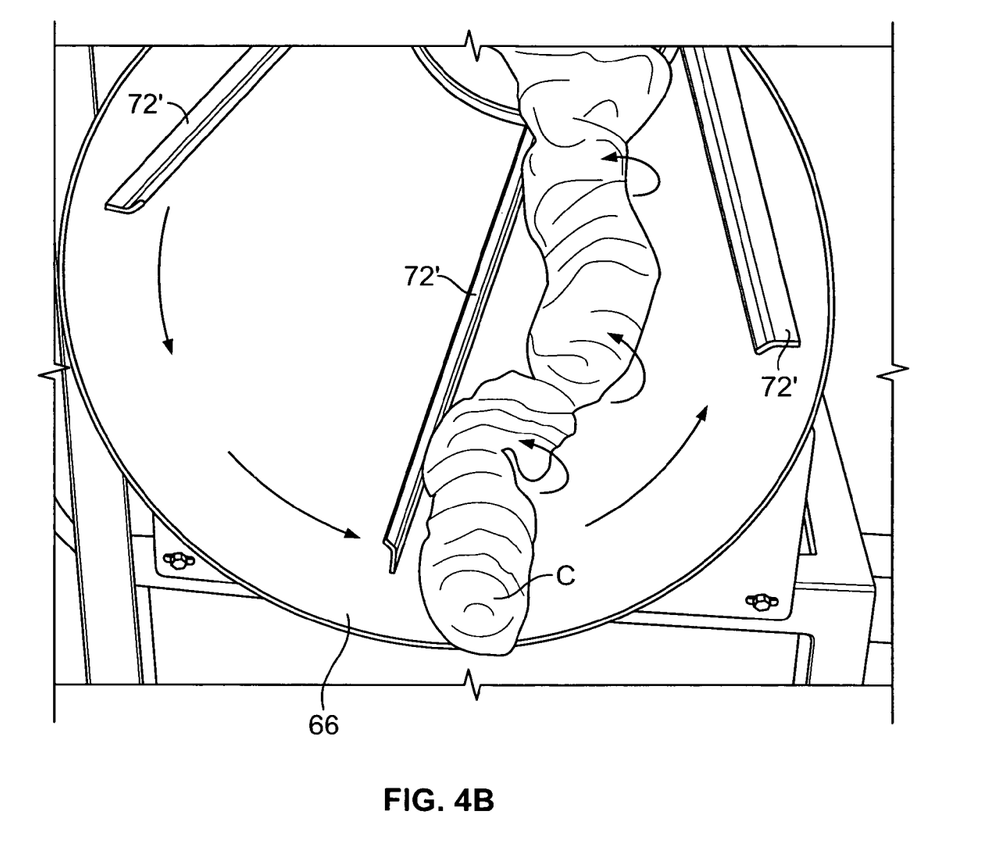
FIG. 4B is a perspective view of the inside of the rotating chute, with alternative longitudinal baffle elements on the inner walls of the chute.

In FIG. 4B, alternative engagement members 72' are shown in the form of fins. It is preferred that suitable materials be used to form engagement members 72 or 72', as with cylindrical chute 66 itself, although it will be appreciated that dissimilar materials may be used and joined by conventional means.

One of skill in the art also will appreciate that the compactness and shape of the strand of cotton candy C as it exits chute 66 can be influenced by a number of factors. For instance, it is preferred that chute 66 is inclined to slope downward from its entrance to its exit. Thus, with respect to the angle of inclination of chute 66 on rolling elements 58, it will be appreciated that the closer chute 66 is to a horizontal position, the more the cotton candy will tend to be compacted and pushing previously made cotton candy out chute 66. Conversely, the greater the angle of inclination of chute 66, less the cotton candy will be compacted and the more the previously made cotton candy will be pulling the trailing cotton candy out of chute 66. The shape and density of the strand of cotton candy C also may be affected by other factors, such as the speed of rotation of chute 66, the smoothness of the inner wall surface of chute 66, the number of engagement members 72, the shape of engagement members 72, and the size of engagement members 72 in terms of height and length. Thus, it is possible to influence the final product which exits chute 66 based on a number of these factors, as desired by the user.

It will be appreciated that a cotton candy handling device in accordance with the present invention may be provided in various configurations that will assist in the continuous making and preparation for automated packaging of the cotton candy. The device includes a cylindrical chute that rolls the cotton candy into a more manageable strand of cotton candy. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such a cotton candy handling device without departing from the scope or spirit of the present invention, and that the claims are not limited to the preferred embodiments illustrated.

What is claimed is:

1. A cotton candy handling device comprising:
a chute having a longitudinal axis, first and second open ends, and engagement members extending longitudinally along an interior surface of the chute with the chute being positioned to locate the first open end relatively higher than the second open end, the chute being rotatably mounted and being driven to rotate about the longitudinal axis while cotton candy is passing through the chute from the first open end to the second open end;
a hopper having an outlet operably coupled to the first open end of the chute;
a drive shaft extending into the hopper; and
a cotton candy making head operable coupled to the drive shaft in the hopper above the chute, wherein the drive shaft rotates the cotton candy making head and the cotton candy making head dispenses cotton candy into the hopper, and wherein the engagement members are configured to increase a density of the cotton candy as the cotton candy passes through the rotating chute.

2. The cotton candy handling device of claim 1, wherein rotation of the chute causes the cotton candy passing through the chute to roll upon itself and form a strand of cotton candy prior to exiting the second open end of the chute.

3. The cotton candy handling device of claim 1, wherein the engagement members further comprise rectangular tubular portions.

4. The cotton candy handling device of claim 1, wherein the engagement members further comprise inwardly projecting fin portions.

5. A cotton candy handling device comprising:
- a chute having a longitudinal axis and having first and second open ends with the chute being positioned to locate the first open end relatively higher than the second open end, the chute being rotatably mounted and being driven to rotate about the longitudinal axis while cotton candy is passing through the chute from the first open end to the second open end;
- a hopper positioned above the chute, wherein the hopper includes a first opening proximate to the chute and a second opening opposite the chute;
- a drive shaft having an end portion that extends into the hopper;
- a granulated sugar dispenser positioned above the hopper;
- a cotton candy making head suspended from the end portion of the drive shaft, wherein the cotton candy making head further includes a shield on a side of the cotton candy making head opposite the hopper, wherein the cotton candy making head receives granulated sugar from the granulated sugar dispenser, and wherein the drive shaft rotates the cotton candy making head as the cotton candy making head dispenses cotton candy and the shield directs the cotton candy into the hopper; and
- a transition chute located between the hopper and the first open end of the rotatably mounted chute, wherein the transition chute is operably coupled to the first open end of the chute and the second opening of the hopper.

6. A cotton candy handling device comprising:
- a chute having a longitudinal axis, first and second open ends, and engagement members extending longitudinally along an interior surface of the chute with the chute being positioned to locate the first open end relatively higher than the second open end, the chute being rotatably mounted and being driven to rotate about the longitudinal axis while cotton candy is passing through the chute from the first open end to the second open end;
- a cotton candy making head located within a hopper above the chute;
- a heating element on the cotton candy making head;
- a transition chute located between the hopper and the first open end of the rotatably mounted chute;
- a granulated sugar dispenser positioned above the hopper; and
- a drive unit having a drive shaft extending downward into the hopper, wherein the cotton candy making head is rotatably mounted on the drive shaft, wherein the cotton candy making head comprises a heating element, and wherein the cotton candy making head receives granulated sugar from the granulated sugar dispenser and provides cotton candy into the hopper, and wherein the rotatably mounted chute receives the cotton candy from the hopper and the engagement members increase a density of the cotton candy as the cotton candy passes through the chute from the first open end to second open end.

7. A cotton candy handling device comprising:
- a cotton candy making head through which heated sugar passes and which produces cotton candy;
- a hopper positioned below the cotton candy making head to receive cotton candy as the cotton candy falls in a path downward from the cotton candy making head;
- a bent tube that is arranged to receive the cotton candy as it falls through the hopper and to redirect the cotton candy at an angle relative to the path downward;
- a chute having first and second open ends, a longitudinal axis, and engagement members extending longitudinally along the chute at an interior surface of the chute, wherein the first open end is positioned higher than the second open end, and wherein the first open end is coupled to the bent tube;
- the chute being rotatably mounted about the longitudinal axis and being arranged to receive the cotton candy from the bent tube, and wherein the engagement members are configured to increase a density of the cotton candy as the cotton candy passes through the rotatably mounted chute.

8. The cotton candy handling device of claim 7, wherein the cotton candy making head is mounted for rotation.

9. The cotton candy handling device of claim 7, wherein the engagement members are arranged to be parallel to the longitudinal axis of the chute.

10. The cotton candy handling device of claim 1, wherein the cotton candy making head includes at least one protrusion extending radially outwardly from the head, and wherein the protrusion directs the cotton candy toward the chute.

11. The cotton candy handling device of claim 10 wherein the cotton candy making head includes a surface opposite the chute and the protrusion is positioned at an inclined angle relative to the surface, and wherein the protrusion creates a downward air flow when the cotton candy making head spins to direct the cotton candy toward the chute.

* * * * *

UNITED STATES PATENT AND TRADEMARK OFFICE
CERTIFICATE OF CORRECTION

PATENT NO.         : 7,641,460 B2                                               Page 1 of 1
APPLICATION NO.    : 11/443335
DATED              : January 5, 2010
INVENTOR(S)        : Cretors et al.

It is certified that error appears in the above-identified patent and that said Letters Patent is hereby corrected as shown below:

In column 6, line 59, in claim 1, delete "operable" and insert -- operably --, therefor.

In column 8, line 11, in claim 6, after "to" insert -- the --.

Signed and Sealed this

Fourth Day of May, 2010

David J. Kappos
*Director of the United States Patent and Trademark Office*